Jan. 3, 1939.    F. JACOBSON    2,142,357
COUPLING
Filed April 2, 1937
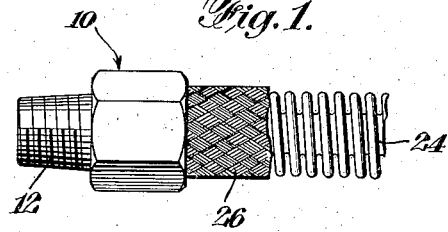
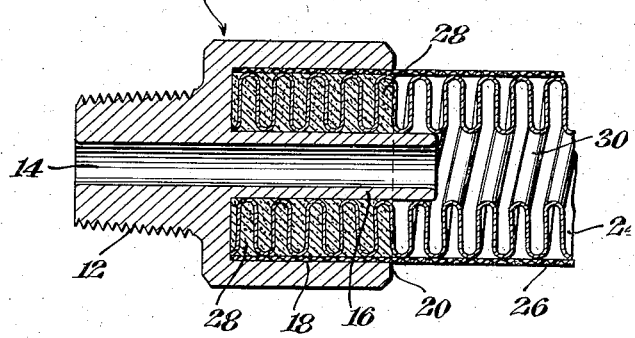
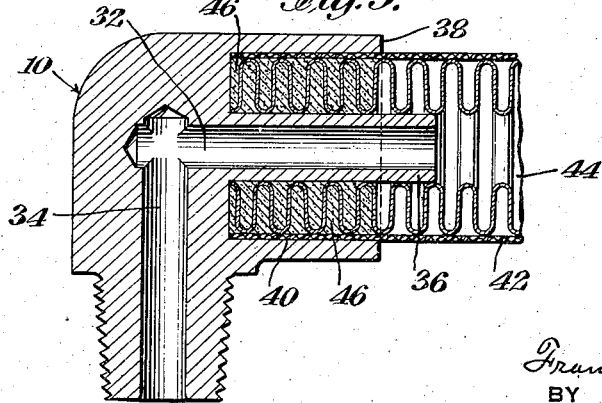
INVENTOR
Franz Jacobson
BY
Kenyon & Kenyon
ATTORNEYS Patented Jan. 3, 1939

2,142,357

UNITED STATES PATENT OFFICE 2,142,357

COUPLING

Franz Jacobson, Brooklyn, N. Y.

Application April 2, 1937, Serial No. 134,476

4 Claims. (Cl. 285—74)

This invention relates to improvements in methods of attaching couplings or fittings to metal hose or flexible metal tubing and the articles produced thereby.

It has been the practice previously to use separate mandrels when metal hose or metal flexible tubing was to be attached to couplings or fittings. Usually an aluminum mandrel was placed within the bore or passage in the coupling, the end of the hose or tubing was then soldered to a cylindrical recess in the coupling. After the soldering operation was completed the aluminum mandrel was removed. However, when this method had to be applied to elbow fittings or other fittings of similar shape it was necessary to extend the bore or passage of the elbow through the wall thereof so that an aluminum mandrel could be inserted into the coupling in order to solder the end of the hose or tubing to the coupling. Then the aluminum mandrel was removed and the opening through the wall of the elbow had to be plugged up. The previous practices are expensive and do not produce as good joints as articles made according to my invention.

According to my invention a soldered connection between a flexible metal tubing and a coupling or fitting is provided. A coupling or fitting is used having a central tubular portion which is surrounded by an annular groove. The end of the metal hose, and metal braid covering, if one is used, to be attached to the coupling in the groove are cleaned and prepared for soldering in the usual way. Molten solder is then poured into the annular groove and the groove is nearly completely filled before the tubing is inserted into the groove. Thereafter the end of the metal hose is inserted into the groove so that the solder flows around the metal hose and forms a rigid construction after the solder solidifies. The central tubular portion extends beyond the end of the coupling so that if too much solder is poured into the groove it will overflow the end of the coupling but will not enter the bore of the coupling. The central tubular portion forms an extension of the bore of the coupling and acts as an integral hollow mandrel during the soldering operation but after the solder is hardened it forms a part of the construction for supporting the metal hose or tubing. The central tubular portion maintains the inside bore of the coupling free from the corrosive action of the soldering fluid. The same procedure is followed where a metal hose or flexible metal tubing is to be attached to an elbow or other fitting and in this way I avoid the necessity of boring a hole through the wall of the elbow in order to attach the metal hose or tubing to such a coupling or fitting. The central tubular portion need not be integral with the coupling but may be formed for example, by forcing a tube through the bore of the coupling.

My invention may also be used with other forms of couplings such as crosses, T's, elbows and the like. The couplings or fittings may be provided with male or female threads. In the drawing I have shown spiral flexible tubing and concentric tubing but other forms of flexible tubing may be used. By using my invention the use of a separate aluminum mandrel is eliminated and the labor necessary to attach the tubing or hosing to the fitting or coupling is substantially reduced. The soldering may be done in the field without a separate mandrel. In addition the flexible tubing or metal hose is more securely held in the groove because the tubing also has its inner folds soldered to the exterior of the central tubular portion. While I prefer to use a metal braid as a covering for the flexible tubing which is soldered in the fitting or coupling together with the tubing or metal hose, it is within the contemplation of my invention to omit such a braid and solder the tubing or metal hose directly to the walls of the groove of the coupling.

In the drawing:

Fig. 1 represents a plan view of a coupling or fitting provided with a flexible tubing with the metal braid covering broken away to facilitate the disclosure;

Fig. 2 represents a longitudinal cross section taken through one form of article made according to my invention; and Fig. 3 represents a longitudinal cross section taken through another form of article made according to my invention.

Referring now to the drawing, the reference character 10 designates a coupling having an externally threaded portion 12 and a longitudinal passage or bore 14. The coupling or fitting 10 is provided with a central tubular portion 16 which is integral with the body of the coupling and which forms an extension of the passage or bore 14 and is preferably of approximately the same size as the inside diameter of the flexible metal tubing to be described presently. The coupling 10 is provided with an annular groove 18 which surrounds the central tubular portion 16. The tubular portion functions as an integral hollow mandrel while the article is being soldered and also forms a reinforcing member for the joint and tubing after the solder has set. It is to be noted that the central tubular portion 16 extends for a distance beyond the end 20 of the coupling for a purpose to be pointed out hereinafter. Positioned within the annular groove is the end of a flexible metal tubing 24 which preferably has a sliding fit with the exterior of the central tubular portion 16 and the groove 18. I prefer to provide a relatively long or deep groove 18 so that a number of convolutions or corrugations of the tubing can be accommodated therein and a better connection is thereby provided. Surrounding the flexible tubing 24 is a tubular metal braid covering 26 which also extends into the annular groove 18. Solder 28 is located within the groove 18 and surrounds the bends of the metal tubing within the groove 18 so that the end of the tubing and the braid covering are securely joined to the walls of the groove of the coupling, the inner bends 30 of the tubing within the groove being soldered to the exterior of the tubular portion 16.

In Fig. 3 I have shown my invention applied to an elbow coupling having a passage or bore 32 and another passage or bore 34 at right angles thereto. If this elbow coupling were to be joined to the metal tubing according to previous practices it would be first necessary to drill the opening 32 through the end wall of the elbow, then place a mandrel through the passage 32, solder the tubing to the elbow, remove the mandrel and then plug up the opening through the wall of the elbow. By using my invention with this form of coupling most of the steps which were heretofore necessary are eliminated. The elbow is provided with a central tubular portion 36 which extends beyond the end 38 of the coupling so that an annular groove 40 is provided in the coupling which is adapted to receive the metal braid covering 42 and the flexible tubing 44. The ends of the braid and tubing are securely fastened to the groove 40 by means of the solder 46 as set forth in connection with the form of my invention described in connection with Fig. 2.

The method of joining the metal braid covering and metal flexible tubing to the coupling or fitting will now be given. The first step is to place the coupling or fitting 10 in a vertical position so that the upper end of the central tubular portion 16 is at the top of the coupling or fitting. The ends of the metal braid and flexible metal tubing which are to be inserted in the groove 18 and the walls of the groove 18 are cleaned and prepared for soldering in the usual manner. The size of the metal tubing and covering is chosen so that the assembly has a sliding fit with the walls of the groove 18 and the inner bends 30 of the tubing have a sliding fit with the exterior of tubular portion 16.

With the coupling in its vertical position molten solder is poured into the annular groove 18 before the braid and tubing are inserted into the annular groove 18. The groove is nearly completely filled but about enough space is left to accommodate for the reduction in volume due to the later insertion of the metal tubing and the braid covering. While the solder is molten, the braid covering and tubing are inserted, preferably slowly, into the annular groove 18 so that the solder flows around the convolutions in the flexible tubing and substantially all of the space between the convolutions of the tubing is taken up by the solder within the groove 18 as shown for example in Fig. 2. The liquid solder is then cooled and hardened by moving a container filled with water upwards around the soldered joint until the joint is completely submerged. As the water can enter the inner part of the joint through the central bore of the coupling, the cooling is done much quicker and at the same time the central bore is cleansed by the water. It is to be noted that the end of the central tubular portion 16 extends beyond the end 20 of the coupling so that if too much molten solder has been placed in the groove 18, it may overflow over the end 20 of the coupling but will not enter the inside of the passage or bore 14 of the central tubular portion 16. In this way clogging of the inside bore or passage of the fitting is made impossible. Also the metal around the central bore eliminates the corrosive action by the soldering flux at the end of the flexible tube. The metal braid and the inner ends of the bends of the flexible tubing have a sliding fit with the walls of the annular groove 18 when the parts are being assembled so that in the finished article when the solder has solidified, there is only a thin film of solder holding the metal braid and tubing to the walls of the groove of the coupling at the points of contact and a strong construction is provided.

The article shown in Fig. 3 may be made in the same way as the article just described in the previous paragraph.

By using my invention it will be seen that the flexible tubing and the metal braid are held to the fitting not only on one end and at the outer diameter thereof but also the inner bends of the tubing are soldered by a thin film exterior of the central tubular portion 16 so as to greatly strengthen the connection or joint at the point of greatest stress. Also the safety against leakage has been increased because it is necessary for the fluid, before it can escape, to pass through all the solder along the outside of the tubular portion 16, then pass under the end of the tubing and finally outside of the tubing along the outer wall of the groove 18.

During the making of the construction shown in Figs. 2 and 3 it will be seen that the tubular central portion 16 acts as an integral hollow mandrel when the solder is being applied to the joint between the metal tubing and the coupling and after the solder is hardened, but instead of removing this mandrel it remains in the article and forms a part of the supporting construction for making a strong joint construction.

It is to be understood that the foregoing examples are given only by way of illustration and that the same may be modified in many particulars without departing from the spirit of my invention.

What I claim is:

1. A device of the character described, including a coupling having a bore and provided adjacent one end with an annular groove and a central tubular portion which extends beyond the end of the coupling to prevent the entry of solder into the bore of the coupling, a flexible metal tubing mounted within said annular groove and substantially fitting therein, and solder means within said groove for connecting said metal tubing to the one wall and bottom of said annular groove and to the exterior of said tubular central portion to form a strong construction.

2. A device of the character described, including a coupling provided with a bore and having one end threaded and provided at its other end with an annular groove, a tubular central portion integral with said coupling and forming the inner wall of said groove and forming an extension of the bore of said coupling, a flexible metal tubing and metal braid covering each having one end thereof mounted within said annular groove so as to have a substantially sliding fit therewith before soldering, and solder means within said groove and joining said inserted ends of said tubing and braid covering to the walls of said annular groove.

3. A device of the character described, including an elbow coupling provided with a bore passing therethrough, said elbow coupling member having a relatively long annular groove in one end thereof substantially concentric with a portion of said bore, a flexible metal tubing having one end mounted within said annular groove and substantially fitting therein, and solder means within said annular groove and surrounding the end of said metal tubing within said annular groove for connecting said metal tubing to the walls and bottom of said annular groove to form a strong construction.

4. A coupling member including a coupling having a bore and an annular flange, said coupling having a central tubular portion longer than the length of said annular flange so that said central tubular portion extends beyond the end of said annular flange, said central tubular portion and annular flange being so arranged as to form an annular groove therebetween of a size to slidingly receive one end of a corrugated tubing with the exterior dimension of said central tubular portion being of about the same as the interior dimension of the corrugated tubing.

FRANZ JACOBSON.